(12) United States Patent
Wei et al.

(10) Patent No.: US 12,173,924 B2
(45) Date of Patent: Dec. 24, 2024

(54) CYLINDRICAL HUMIDIFIER

(71) Applicant: Guangdong Miwo Technology Co., Ltd., Guangdong (CN)

(72) Inventors: Feng Wei, Hunan (CN); Binfa Yang, Shaanxi (CN)

(*) Notice: Subject to any disclaimer, the term of this patent is extended or adjusted under 35 U.S.C. 154(b) by 422 days.

(21) Appl. No.: 17/807,857

(22) Filed: Jun. 20, 2022

(65) Prior Publication Data

US 2023/0184448 A1 Jun. 15, 2023

(30) Foreign Application Priority Data

Dec. 14, 2021 (CN) .......................... 202123154552.2

(51) Int. Cl.
| | |
|---|---|
| *F24F 6/12* | (2006.01) |
| *B01F 23/21* | (2022.01) |
| *B01F 23/213* | (2022.01) |
| *F24F 6/14* | (2006.01) |
| *F24F 11/89* | (2018.01) |
| *F24F 13/20* | (2006.01) |
| *F24F 6/00* | (2006.01) |

(52) U.S. Cl.
CPC ............ *F24F 6/14* (2013.01); *B01F 23/2133* (2022.01); *F24F 6/12* (2013.01); *F24F 11/89* (2018.01); *F24F 13/20* (2013.01); *F24F 2006/008* (2013.01); *F24F 2006/143* (2013.01); *F24F 2013/205* (2013.01)

(58) Field of Classification Search
CPC ........ F24F 6/02; F24F 6/12; F24F 6/14; F24F 13/20; F24F 2006/008; B01F 23/2133
See application file for complete search history.

(56) References Cited

FOREIGN PATENT DOCUMENTS

CN            210345757 U   *   4/2020

* cited by examiner

*Primary Examiner* — Robert A Hopkins
(74) *Attorney, Agent, or Firm* — Prakash Nama; Global IP Services, PLLC

(57) ABSTRACT

A cylindrical humidifier, including a housing, a water tank, an atomization assembly, and a water feed assembly. The water tank is mounted in the housing, and is detachably connected to the atomization assembly. A lower end of the atomization assembly is arranged in the housing while an upper end thereof is detachably connected to a top end of the housing. The water feed assembly is mounted at the bottom of the atomization assembly and the water tank. The water feed assembly includes a lever bracket, a sealing bar, a pushing block, a spring, a pushing ball, a pushing bar, and a float. Water entering the water tank is controlled through the water feed assembly, so that the humidifier can maintain a constant water depth, and is always kept in the best working state, thereby achieving the maximum atomization efficiency.

9 Claims, 5 Drawing Sheets

CYLINDRICAL HUMIDIFIER

CROSS-REFERENCE TO RELATED APPLICATIONS

This application claims the benefit and priority of Chinese Patent Application Number CN202123154552.2, filed on Dec. 14, 2021 with China National Intellectual Property Administration, the disclosures of which are incorporated herein by reference in their entireties.

TECHNICAL FIELD

The invention relates to the field of humidifiers, and particular to a cylindrical humidifier.

BACKGROUND ART

Humidifiers are a household appliance for increasing the humidity of rooms. For most of the traditional humidifiers, water is added in a down-adding manner, that is, adding water from the bottom of a water tank, sealing a water filling cap after the water tank is filled with water, and then mounting the water tank onto a humidifier base. They are complicated in structure, complicated in operation, and prone to water leakage, which affects the use for users.

SUMMARY

The technical problem to be solved by the utility model is to provide a cylindrical humidifier in view of the above-mentioned defects in the prior art, so as to solve the problems raised in the Background Art.

In order to solve the foregoing technical problems, the utility model adopts the technical solution as below: a cylindrical humidifier includes a housing, a water tank, an atomization assembly, and a water feed assembly; the water tank is mounted in the housing, and is detachably connected to the atomization assembly, a lower end of the atomization assembly is arranged in the housing while an upper end thereof is detachably connected to a top end of the housing, and the water feed assembly is mounted at the bottom of the atomization assembly and the water tank; the water feed assembly includes a lever bracket, a sealing bar, a pushing block, a spring, a pushing ball, a pushing bar, and a float, the lever bracket is mounted at a bottom end of the atomization assembly, the float is arranged in the water tank, and extends outward to be provided with a connecting lever, and the middle of the connecting lever is rotationally connected to the lever bracket; the bottom of the water tank is provided with an insert socket, an upper end of the sealing bar is inserted in the insert socket to extend upward into the water tank, a top surface of a lower end of the sealing bar is in close contact with a bottom surface of the water tank so as to seal the insert socket, the lower end of the sealing bar is provided with a water inlet communicating with the insert socket, the spring is arranged in the upper end of the sealing bar, a bottom end of the spring is mounted on the top surface of the lower end of the sealing bar, the pushing ball is mounted at the other end of the spring, a bottom end of the pushing bar is mounted on the pushing ball, a top end of the pushing bar is connected to the connecting lever, the pushing block sleeves the pushing ball and the spring and is arranged in the upper end of the sealing bar, and the pushing ball mates with the pushing block to open or seal the water inlet.

A further elaboration on the above technical solution is as follows.

In the foregoing technical solution, the atomization assembly includes an atomization support, a plate atomizer, and a mist outlet cover, a lower end of the atomization support is arranged in the water tank while an upper end thereof is detachably connected to a top end of the housing, the mist outlet cover is mounted on a top end of the atomization support, the lever bracket is mounted at a bottom end of the atomization support, and the plate atomizer is arranged on the lever bracket, and connected to the bottom end of the atomization support.

In the foregoing technical solution, the sealing bar includes an inserting part and a sealing part, the sealing part is mounted on the bottom of the inserting part, arranged outside the bottom of the water tank, and mates with the bottom of the water tank to seal the insert socket, and the inserting part is upward inserted in the insert socket.

In the foregoing technical solution, the water feed assembly includes a seal ring, and the seal ring sleeves the inserting part, is arranged in a top surface of the sealing part, and is in close contact with the bottom surface of the water tank.

In the foregoing technical solution, the water feed assembly further includes a rotating shaft, the middle of the connecting lever sleeves the rotating shaft and is capable of rotating about the rotating shaft, and two ends of the rotating shaft are mounted on the lever bracket.

In the foregoing technical solution, the atomization assembly further includes a fan, the atomization support is provided with an air duct extending downward, an air outlet is formed at the bottom of the air duct, the fan is mounted in the top end of the atomization support and communicates with the air duct, the mist outlet cover is provided with air inlet holes, and the air inlet holes communicate with the fan.

In the foregoing technical solution, the mist outlet cover is of a grill shape.

In the foregoing technical solution, the humidifier further includes a liquid level meter, a window is formed on an outer surface of the housing, and the liquid level meter is mounted in the window.

In the foregoing technical solution, a snap-fit lug extending upward is arranged on a bottom surface of the top end of the atomization support, a fastener is arranged at the top end of the water tank, the fastener is provided with a fastening slot for snap fit with the snap-fit lug, and the snap-fit lug is in snap fit in the fastening slot.

Compared with the prior art, the cylindrical humidifier of the utility model has the beneficial effects that the cylindrical humidifier is of a reasonable and compact structure, which makes full use of space, reduces space waste, and facilitates packaging and transportation; water entering the water tank is controlled through the water feed assembly, so that the humidifier can maintain a constant water depth, and is always kept in the best working state, thereby achieving the maximum atomization efficiency.

Figure 1:
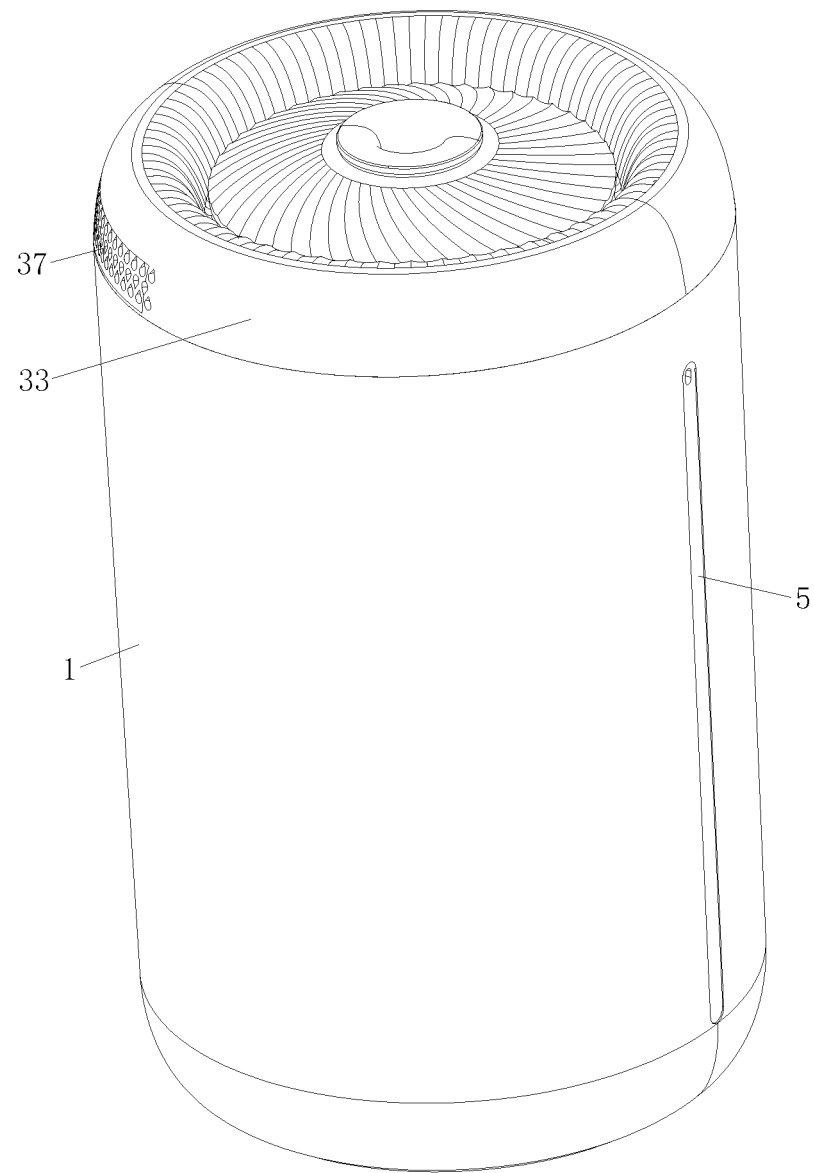
FIG. 1 is a schematic structural diagram of the utility model.

In the figures: 1. housing; 11. window; 2. water tank; 21. insert socket; 22. fastener; 23. fastening slot; 3. atomization assembly; 31. atomization support; 32. plate atomizer; 33 mist outlet cover; 34, fan; 35, air duct; 36, air outlet; 37, air inlet holes; 38, snap-fit lug; 4, water feed assembly; 41, lever bracket; 42, sealing bar; 421, water inlet; 422, inserting part; 423, sealing part; 43, pushing block; 44, spring; 45, pushing ball; 46, pushing bar; 47, float; 48, connecting lever; 49, rotating shaft; 410, seal ring; and 5. liquid level meter.

DETAILED DESCRIPTION OF EMBODIMENTS

The following further describes the utility model in detail with reference to the accompanying drawings.

The embodiments described with reference to the drawings are exemplary and are intended to explain this application, but cannot be understood as a limitation of this application. In the descriptions of this application, it should be understood that the orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation to this application. In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of this application, "a plurality of" and "multiple" mean at least two, unless otherwise limited definitely and specifically. In the descriptions of this application, unless otherwise specified and defined explicitly, the terms "installation", "link", "connection" and "fixing" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two elements. A person of ordinary skills in the art can understand specific meanings of these terms in this application based on specific situations. In this application, unless otherwise explicitly specified and defined, a first feature being "on" or "under" a second feature may include a direct contact between the first feature and the second feature, or may include that the first feature and the second feature are not in direct contact but in contact through an additional feature between them. In addition, the first feature being "above", "over" and "on upside of" the second feature includes the first feature being directly above and obliquely above the second feature, or simply means that the level of the first feature is higher than that of the second feature. The first feature being "below", "beneath" and "on underside of" the second feature includes the first feature being directly above and obliquely above the second feature, or simply means that the level of the first feature lower than the that second feature.

As shown in FIG. 1 to FIG. 5, a cylindrical humidifier includes a housing 1, a water tank 2, an atomization assembly 3, and a water feed assembly 4; the water tank 2 is mounted in the housing 1, and is detachably connected to the atomization assembly 3, a lower end of the atomization assembly 3 is arranged in the housing 1 while an upper end thereof is detachably connected to a top end of the housing 1, and the water feed assembly 4 is mounted at the bottom of the atomization assembly 3 and the water tank 2. The inside of the housing 1 is used to store an appropriate amount of water, and the inside of the water tank 2 mates with the atomization assembly 3 to form an atomization cavity.

In an embodiment, as shown in FIG. 2 to FIG. 5, the water feed assembly 4 includes a lever bracket 41, a sealing bar 42, a pushing block 43, a spring 44, a pushing ball 45, a pushing bar 46, and a float 47; the lever bracket 41 is mounted at a bottom end of the atomization assembly 3, the float 47 is arranged in the water tank 2, and extends outward to be provided with a connecting lever 48, and the middle of the connecting lever 48 is rotationally connected to the lever bracket 41. The bottom of the water tank 2 is provided with an insert socket 21, an upper end of the sealing bar 42 is inserted in the insert socket 21 to extend upward to the inside of the water tank 2, a top surface of a lower end of the sealing bar is in close contact with a bottom surface of the water tank 2 so as to seal the insert socket 21, and the lower end of the sealing bar is provided with a water inlet 421 communicating with the insert socket 21. A diameter of the water inlet 421 is much smaller than that of the insert socket 21, so that a feeding speed of a water flow is effectively controlled to prevent the water flow from entering too fast to affect induction of the float 47 to result in excessive water in the water tank 2 and affect the atomization effect. The spring 44 is arranged in the upper end of the sealing bar 42, a bottom end of the spring is mounted on the top surface of the lower end of the sealing bar 42, the pushing ball 45 is mounted at the other end of the spring 44, a bottom end of the pushing bar 46 is mounted on the pushing ball 45, a top end of the pushing bar is connected to the connecting lever 48, the pushing block 43 sleeves the pushing ball 45 and the spring 44 and is arranged in the upper end of the sealing bar 46, and the pushing ball 45 mates with the pushing block 43 to open or seal the water inlet 421. With the arrangement of the connecting lever 48 and the lever bracket 41, the pushing block 43 and the pushing ball 45 are driven to move up and down so as to open or close the water inlet 421 to control feeding of water, thereby making actions more stable and reliable and achieving higher precision and better sealing performance.

Figure 4:
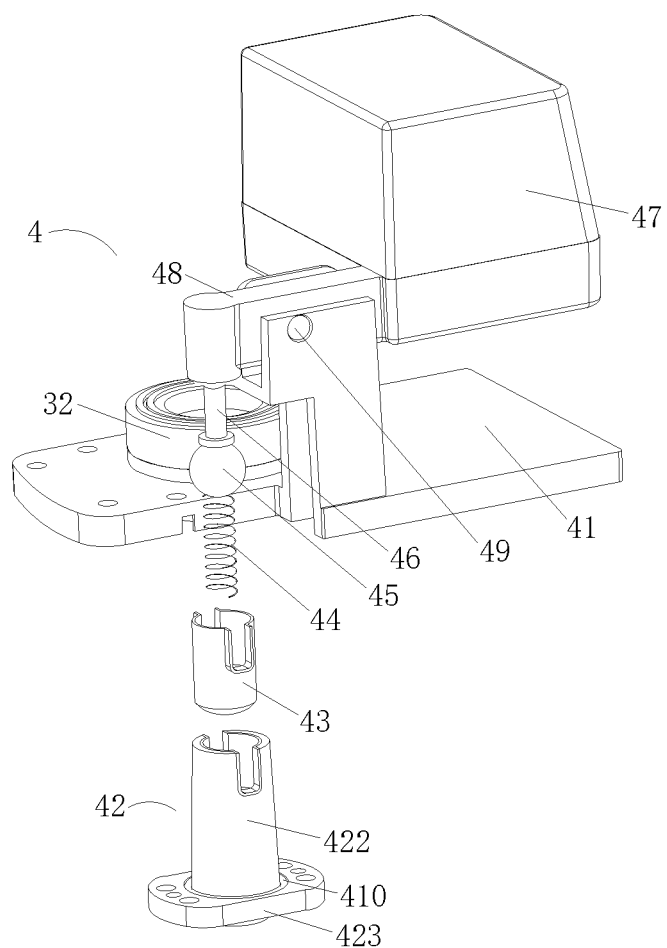
FIG. 4 is a schematic structural diagram of a water feed assembly in the utility model.
Figure 5:
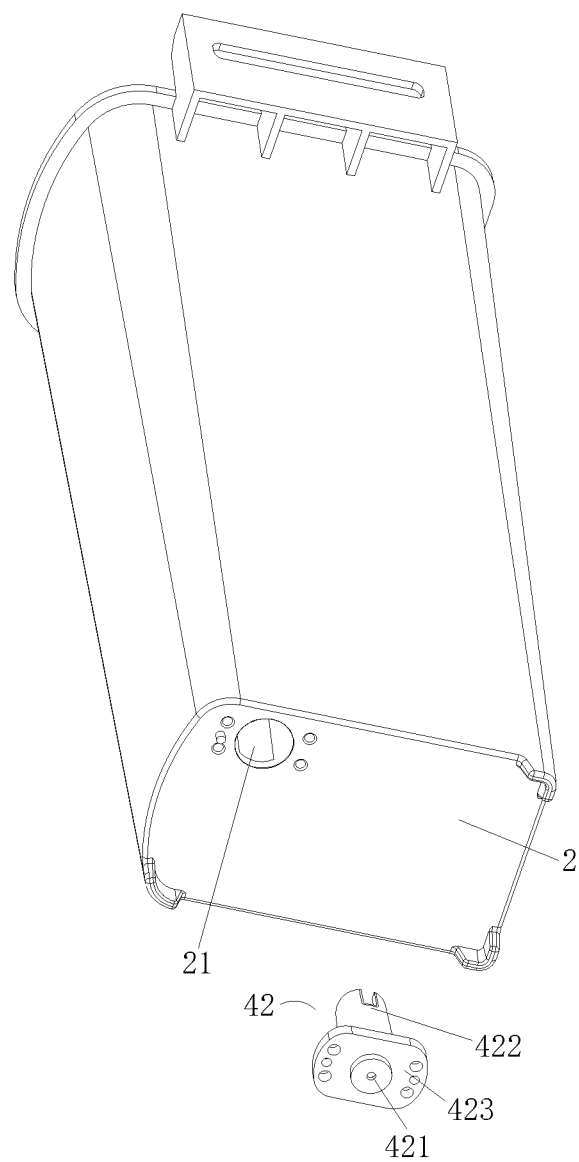
FIG. 5 is a schematic diagram of a partial structure of the utility model.

Specifically, as shown in FIG. 4 and FIG. 5, the sealing bar 42 includes an inserting part 422 and a sealing part 423; the sealing part 423 is mounted on the bottom of the inserting part 422, arranged outside the bottom of the water tank 2, and mates with the bottom of the water tank 2 to open or close the water inlet 421, and the inserting part 422 is movably inserted in the water inlet 421. Specifically, the water feed assembly 4 further includes a rotating shaft 49, the middle of the connecting lever 48 sleeves the rotating shaft 49 and is capable of rotating about the rotating shaft 49, and two ends of the rotating shaft 49 are mounted on the lever bracket 41, so that the float 47 can oscillate more stably and accurately.

During use, an appropriate amount of water is added into the housing 1 first, and then the atomization assembly 3 is secured in the water tank 2. Then, there is no water in the water tank 2, the float 47 moves downward under its own gravity, the connecting lever 48 moves upward around the rotating shaft 49 so that the other end of the connecting lever tilts upward, and the pushing block 43 and pushing ball 45 move upward away from the water inlet 421, the spring 44 is stretched upward, water flows into the water tank 2 from the water inlet 421, and then a liquid level in the water tank 2 continuously rises. After liquid in the water tank 2 reaches a required height, the float 47 floats upward under the action of buoyancy of water, the connecting lever 48 moves downward around the rotating shaft 49 so that the other end of the connecting lever is pressed down, the pushing block 43 and the pushing ball 45 move downward close to the water inlet 421, and a spring force of the spring 44 pulls the pushing ball 45 to move downward, so that the pushing block 43 and the pushing ball 45 block and seal the water inlet 421 to prevent water flowing into the water tank 2.

Specifically, as shown in FIG. 4, the water feed assembly 4 further includes a seal ring 410, and the seal ring 410 sleeves the inserting part 422, is arranged in a top surface of the sealing part 423, and is in close contact with or away from the bottom surface of the water tank 2, so that a better sealing performance between the sealing part 423 and the bottom of the water tank 2 is achieved, and water is prevented from entering the water tank 2 during sealing.

Figure 2:
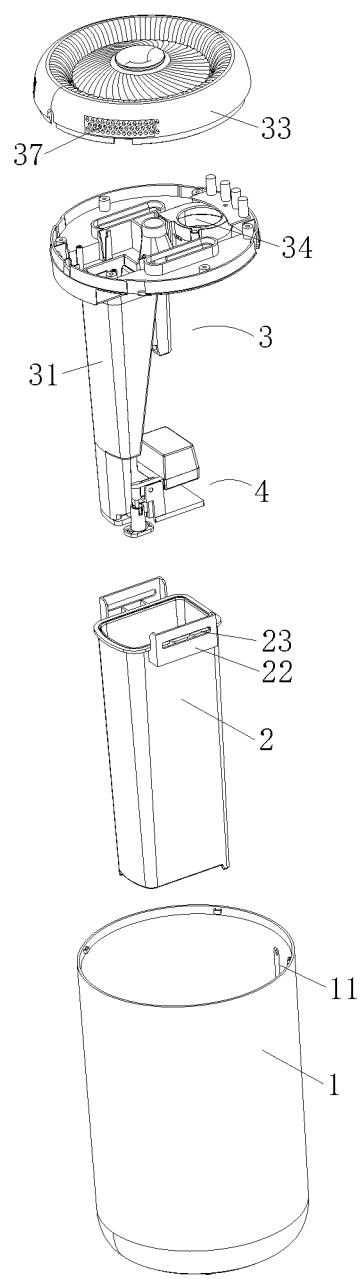
FIG. 2 is an exploded structural diagram of the utility model.
Figure 3:
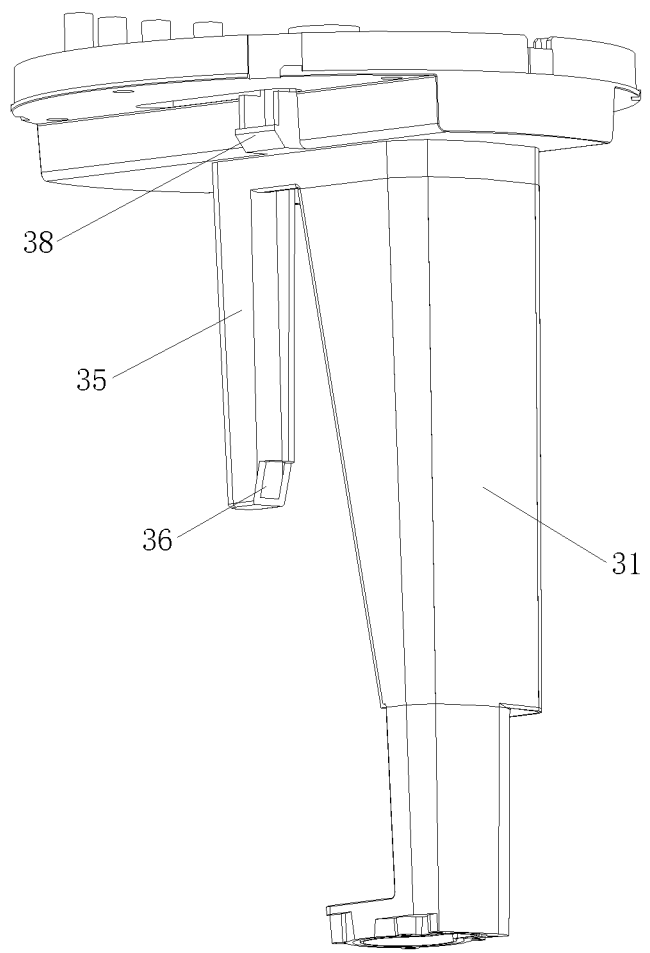
FIG. 3 is a schematic structural diagram of an atomization support in the utility model.

In the embodiment, as shown in FIG. 2 and FIG. 3, the atomization assembly 3 includes an atomization support 31, a plate atomizer 32, and a mist outlet cover 33; a lower end of the atomization support 31 is arranged in the water tank 2 while an upper end thereof is detachably connected to a top end of the housing 1, the mist outlet cover 33 is mounted on a top end of the atomization support 31, the lever bracket 41 is mounted at a bottom end of the atomization support 31, and the plate atomizer 32 is arranged on the lever bracket 41, and connected to the bottom end of the atomization support 31.

As shown in FIG. 2 and FIG. 3, the atomization assembly 3 further includes a fan 34, the atomization support 31 is provided with an air duct 35 extending downward, an air outlet 36 is formed at the bottom of the air duct 35, the fan 34 is mounted in the top end of the atomization support 31 and communicates with the air duct 35, the mist outlet cover 33 is provided with air inlet holes 37, and the air inlet holes 37 communicate with the fan 34. A downward extending length of the air duct 34 is about half of a length of the lower end of the atomization support 31. The design is reasonable, and air can be effectively delivered into the water tank 2, thereby improving the atomization efficiency while preventing water entering the air duct 35. Of course, the length of the air duct 35 may be set according to the actual situation, which is not limited in the embodiment.

As shown in FIG. 1 to FIG. 3, the air outlet cover 33 is of a grill shape, which makes the outgoing mist more uniformly dispersed, thereby meeting the needs of use. The cylindrical humidifier further includes a liquid level meter 5, a window 11 is formed on an outer surface of the housing 1, and the liquid level meter 5 is mounted in the window 11 to realize monitoring the volume of water in the housing 1 in real time, thereby avoiding too little or too much water that affects the use.

As shown in FIG. 2 and FIG. 3, a snap-fit lug 38 extending outward is arranged on a bottom surface of the top end of the atomization support 31, a fastener 22 is arranged on the top end of the water tank 2, the fastener 22 is provided with a fastening slot 23 for snap fit with the snap-fit lug 38, and the snap-fit lug 38 is in snap fit in the fastening slot 23, thereby facilitating mounting and demounting between the atomization support 31 and the water tank 2, and facilitating the follow-up maintenance.

The cylindrical humidifier of the utility model is of a reasonable and compact structure, which makes full use of space, reduces space waste, and facilitates packaging and transportation. Water entering the water tank 2 is controlled through the water feed assembly 3, so that the humidifier can maintain a constant water depth, and is always kept in the best working state, thereby achieving the maximum atomization efficiency.

The above is not intended to limit the technical scope of the utility model, and any modifications, equivalent changes and modifications made to the above embodiments according to the technical essence of the utility model still fall within the scope of the technical solution of the utility model.

We claim:

1. A cylindrical humidifier, comprising a housing, a water tank, an atomization assembly, and a water feed assembly, wherein the water tank is mounted in the housing, and is detachably connected to the atomization assembly, a lower end of the atomization assembly is arranged in the housing while an upper end thereof is detachably connected to a top end of the housing, and the water feed assembly is mounted at the bottom of the atomization assembly and the water tank; the water feed assembly includes a lever bracket, a sealing bar, a pushing block, a spring, a pushing ball, a pushing bar, and a float, the lever bracket is mounted at a bottom end of the atomization assembly, the float is arranged in the water tank, and extends outward to be provided with a connecting lever, and the middle of the connecting lever is rotationally connected to the lever bracket; the bottom of the water tank is provided with an insert socket, an upper end of the sealing bar is inserted in the insert socket to extend upward to the inside of the water tank, a top surface of a lower end of the sealing bar is in close contact with a bottom surface of the water tank so as to seal the insert socket, the lower end of the sealing bar is provided with a water inlet communicating with the insert socket, the spring is arranged in the upper end of the sealing bar, a bottom end of the spring is mounted on the top surface of the lower end of the sealing bar, the pushing ball is mounted at the other end of the spring, a bottom end of the pushing bar is mounted on the pushing ball, a top end of the pushing bar is connected to the connecting lever, the pushing block sleeves the pushing ball and the spring and is arranged in the upper end of the sealing bar, and the pushing ball mates with the pushing block to open or seal the water inlet.

2. The cylindrical humidifier according to claim 1, wherein the atomization assembly comprises an atomization support, a plate atomizer, and a mist outlet cover, a lower end of the atomization support is arranged in the water tank while an upper end thereof is detachably connected to a top end of the housing, the mist outlet cover is mounted on a top end of the atomization support, the lever bracket is mounted at a bottom end of the atomization support, and the plate atomizer is arranged on the lever bracket, and connected to the bottom end of the atomization support.

3. The cylindrical humidifier according to claim 2, wherein the sealing bar comprises an inserting part and a sealing part, the sealing part is mounted on the bottom of the inserting part, arranged outside the bottom of the water tank, and mates with the bottom of the water tank to seal the insert socket, and the inserting part is upward inserted in the insert socket.

4. The cylindrical humidifier according to claim 3, wherein the water feed assembly further comprises a seal ring, and the seal ring sleeves the inserting part, is arranged in a top surface of the sealing part, and is in close contact with the bottom surface of the water tank.

5. The cylindrical humidifier according to claim 1, wherein, the water feed assembly further comprises a rotating shaft, the middle of the connecting lever sleeves the rotating shaft and is capable of rotating about the rotating shaft, and two ends of the rotating shaft are mounted on the lever bracket.

6. The cylindrical humidifier according to claim 2, wherein the atomization assembly further comprises a fan, the atomization support is provided with an air duct extending downward, an air outlet is formed at the bottom of the air duct, the fan is mounted in the top end of the atomization support and communicates with the air duct, the mist outlet cover is provided with air inlet holes, and the air inlet holes communicate with the fan.

7. The cylindrical humidifier according to claim 2, wherein the mist outlet cover is of a grill shape.

8. The cylindrical humidifier according to claim 1, wherein further comprising a liquid level meter, a window is formed on an outer surface of the housing, and the liquid level meter is mounted in the window.

9. The cylindrical humidifier according to claim 2, wherein a snap-fit lug extending outward is arranged on a bottom surface of the top end of the atomization support, a fastener is arranged at the top end of the water tank, the fastener is provided with a fastening slot for snap fit with the snap-fit lug, and the snap-fit lug is in snap fit in the fastening slot.

\* \* \* \* \*